Patented June 19, 1951

2,557,509

UNITED STATES PATENT OFFICE 2,557,509

COMPOSITION AND PROCESS FOR PROTECTING FERROUS METALS FROM RUSTING IN MOIST AIR

Dariel E. Miller, East Los Angeles, Calif., assignor to Kelite Products, Inc., Los Angeles, Calif., a corporation of California No Drawing. Application January 21, 1949, Serial No. 72,068

5 Claims. (Cl. 148—6.24)

This invention relates to a composition for protecting ferrous metals from rusting in moist air and the composition and process of the present invention is also effective to some extent in protecting ferrous metals from rusting in water.

The present invention embodies the discovery that ferrous metals may be protected from rusting by forming on the surface of the metal to be protected a coating of a molybdate compound believed to be ferric molybdate $Fe_2(MoO_4)_3 \cdot xH_2O$. Ferrous metals having the coating of molybdate thereon have not only the advantage that they are protected from rusting in moist air but that such metals or the coatings may be washed or rinsed without loss of the rust resistant properties. Furthermore, ferrous metal having the molybdate coating thereon is, to a limited extent at least, resistant to rust even when left immersed in water.

The formation of the desired molybdate compound on ferrous metals appears to be dependent on there being iron present in the ferric form. The reaction between molybdic acid $H_2MoO_4$ and ferric iron proceeds with the formation of ferric molybdate $Fe_2(MoO_4)_3 \cdot xH_2O$, which is an insoluble compound, whereas the reaction of ferrous iron with molybdic acid produces ferrous molybdate $FeMoO_4$, a soluble compound which on the surface of a ferrous metal appears unable to protect the metal from rusting unless the ferrous compound is oxidized to the ferric form.

In accordance with the process of the present invention the desired coating of ferric molybdate is formed on the surface of ferrous metals by treating such surfaces with solutions of molybdic acid. Reliable results are not obtained unless the solutions of molybdic acid have the proper pH. The optimum results are obtained on using molybdic acid solutions having a pH of 2.0 to 4.0. The benefit of the treatment markedly decreased as the pH of the solution used increases from 4.0 to 7.0. If the acidity of the solution is greater than a pH of 2.0 (i. e. has a pH of less than 2.0) the excess acid will tend to cause rust in drying. Treatment of ferrous metal surfaces with molybdic acid solution having a pH of 7.0 or greater is generally ineffective for protecting the metals from rusting. The process of the present invention has the advantage that it may be carried out with the solutions cold, i. e. at room temperature, and is effected in short periods of time.

The present invention also embodies a preferred composition for treating ferrous metals to prevent rusting. The preferred composition is in the form of a solid preparation and mixture of ingredients in a form which allows the preparation of a desired treating solution from the composition merely by adding the composition to water. The composition consists of an admixture of molybdenum trioxide $MoO_3$, sodium acid sulfate and sodium sulfate. It is preferable but not essential that the composition also include a suitable wetting agent. The proportions of the constituents of the composition should be within the following ranges: molybdenum oxide $MoO_3$, 5% to 50%; sodium acid sulfate $NaHSO_4$, 2% to 50% and sodium sulfate $Na_2SO_4$, 0% to 93%. In such a composition the sodium acid sulfate when dissolved in water will provide the requisite acidity not only to effect solution of the molybdenum trioxide thereby forming molybdic acid in solution, but will also regulate the pH of the solution to bring the solution within the limits of the pH of 2.0 to 4.0 thereby forming an optimum solution for the treatment of ferrous metals to prevent rusting. The sodium sulfate content of the composition is employed not only to facilitate the dispersion in the mixture of the molybdenum oxide and sodium acid sulfate but also serves to produce a product in the form of a granular or powder solid admixture which may be packaged and handled without substantial caking.

The process and the composition of the present invention will be more fully understood from the following examples:

Where the molybdic acid solution used in the process of treating the ferrous metal does not have a pH within the preferred range it is possible to secure protection provided certain pretreatments of the metal are followed, which are generally unnecessary when the preferred composition or solution is employed. Thus, for example, it has been found that a sanded panel of iron or steel will not be protected from rust by dipping the panel in a neutral solution of molybdic acid, whereas by preliminarily treating the panel with solutions of ferrous sulfate or ferric chloride before treating the panel with a neutral solution of molybdic acid, rust protection may be effected. Likewise, where the surface of the metal to be treated is first cleaned to remove grease by any usual cleaner for that purpose and then rinsed and the surface pickled in an acid solution to remove rust, rust protection may be obtained by thereafter dipping the metal in a solution of molybdic acid or spraying a solution of molybdic acid on the metal even when the pH of the molybdic acid solution is somewhat higher than the preferred range. A suitable pickling treatment, for example, to be applied before the molybdic acid treatment consists in an immersion of the panel to be treated in a 5% solution of hydrochloric or sulfuric acid at about 80° C. for ten minutes. Where the pretreatments are employed I have found, for example, that some rust protection may be obtained merely by applying solutions of molybdic acid in water, for example, solutions containing as low as about 0.03% molybdic acid. The effectiveness, however, is enhanced by the inclusion in the treating solution of an acidifying agent, the particular acidifying agent used being relatively unimportant, the determining factor being the acidity or pH of the resulting solution. Thus, in one example of the invention a solution containing about 0.1% of molybdic acid and 0.1% of sodium acid sulfate was employed, the sodium acid sulfate comprising the acidifying agent. In another example of the present invention phosphoric acid was substituted for sodium acid sulfate. In a further example of the present invention formic acid was employed as the acidifying agent, the particular solution employed containing about 0.1% molybdic acid and about 1.5% formic acid.

In each case the treatments of the metal surfaces to be protected were carried out with the solutions at room temperature, and a suitable duration of treatment is about one minute. After the treatments with the molybdic acid solutions it is recommended that the surface treated be rinsed. After rinsing there is obtained a bright metallic panel with no visible coating of molybdic compound, yet following such treatments the metal surfaces will be protected from rusting.

While after the treatment there is no visible evidence of molybdic coating on the surface of the metal treated, the presence of a molybdenum compound as a coating may be established in various ways. Thus, for example, if the surface of the treated metal is rubbed with weak caustic soda solution and then tested with stannous chloride the presence of the blue molybdenum ring will be apparent.

In the preferred process of the present invention the preferred composition is employed which, is previously stated, consists of a solid admixture of molybdenum trioxide, sodium acid sulfate and sodium sulfate. With such a preferred composition no preliminary treatment of the surface of the metal to be protected is necessary, in fact such preliminary treatment, apart from a possible cleaning of the metal surface to remove grease, will not normally attribute anything to the rust protection. In using the preferred composition the composition is added to water in suitable proportion to produce a solution containing preferably from 0.03% to 1% of molybdic acid. While, as previously stated, the composition of the present invention may include from 5% to 50% of the molybdenum trioxide, 2% to 50% of sodium acid sulfate and 50% to 95% of the sodium sulfate, the composition is best prepared with the proportions of the molybdenum trioxide and sodium acid sulfate in the smaller ends of the range stated and with the greater bulk of the material present as sodium sulfate.

An example of an excellent mixture for the purposes of the present invention is one containing about 5% to 10% of $MoO_3$, 2% to 10% of $NaHSO_4$ and 80% to 93% of $Na_2SO_4$. In protecting ferrous metals from rusting sufficient of such composition is added to water to produce a solution which may have a preferred concentration of 0.1% molybdic acid.

While the particular forms of the process and composition for protecting ferrous metals from rusting herein described is well adapted to carry out the objects of the present invention, various modifications and changes may be made and this invention is of the scope set forth in the appended claims.

I claim:

1. A process of protecting a ferrous metal surface from rusting which process comprises treating the surface to be protected with an aqueous solution the solute of which essentially consists of molybdenum trioxide and sodium acid sulfate, the solution containing from 0.03% to 1% of molybdic acid and having sufficient sodium acid sulfate to provide a pH of from 2.0 to 4.0.

2. A process of protecting ferrous metals from rusting which process comprises treating the surface to be protected with an aqueous solution the solute of which essentially consists of from 5 to 50% of molybdenum trioxide, 2 to 50% of sodium acid sulfate and 50 to 95% sodium sulfate, the solution having a pH from 2.0 to 4.0.

3. A process of protecting a ferrous metal surface from rusting which process comprises treating the surface to be protected with an aqueous solution the solute of which essentially consists of from 5 to 10% molybdenum trioxide, 2 to 10% of sodium acid sulfate and 80 to 93% sodium sulfate, the solution having a pH of 2.0 to 4.0, the solute forming in solution between 0.03 and 1% of molybdic acid.

4. A composition for protecting ferrous metals from rusting, which composition essentially consists of 5 to 50% molybdenum trioxide $MoO_3$, 2 to 50% sodium acid sulfate $NaHSO_4$, and from 0 to 93% of sodium sulfate $Na_2SO_4$, said composition constituting a solid admixture.

5. A composition for protecting ferrous metals from rusting when added to water, which composition essentially consists of from 5 to 10% of molybdenum trioxide $MoO_3$, 2 to 10% of sodium acid sulfate $NaHSO_4$, and 80 to 93% of sodium sulfate, said composition constituting a solid admixture.

DARIEL E. MILLER.

REFERENCES CITED

The following references are of record in the file of this patent:

UNITED STATES PATENTS

| Number | Name | Date |
|---|---|---|
| 1,784,106 | Pacz | Dec. 9, 1930 |

OTHER REFERENCES

H. Krause, Chemical Abstracts, vol. 31 (1937), column 3846.

Handbook of Chemistry and Physics, 27th ed. (1943), pages 418–419, publ. by Chemical Rubber Publ. Co., Cleveland, Ohio.